United States Patent [19]
Bose et al.

[11] 3,725,406
[45] Apr. 3, 1973

[54] BENZIMIDAZOLE DERIVATIVES AS FUNGICIDAL ACTIVE COMPOUNDS

[75] Inventors: Elaine A. Bose; Earl R. White, both of Davis, Calif.

[73] Assignee: The Regents of the University of California, Berkley, Calif.

[22] Filed: Oct. 12, 1971

[21] Appl. No.: 188,499

Related U.S. Application Data

[63] Continuation-in-part of Ser. No. 172,205, Aug. 16, 1971, abandoned.

[52] U.S. Cl..............................260/249.5, 424/249
[51] Int. Cl. .............................................C07d 57/34
[58] Field of Search....................................260/249.5

[56] References Cited

UNITED STATES PATENTS 2,350,376   6/1944   Tishler et al......................260/260 X

*Primary Examiner*—John M. Ford
*Attorney*—Daniel C. Block et al.

[57] ABSTRACT

The method of manufacture, method of use and fungicidal active compounds are described herein. The active compounds have the following formula:

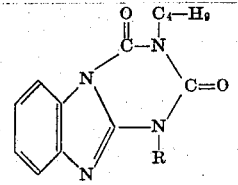

wherein R can be selected from the group consisting of hydrogen, sodium, potassium and ammonium.

10 Claims, No Drawings

BENZIMIDAZOLE DERIVATIVES AS FUNGICIDAL ACTIVE COMPOUNDS

CROSS REFERENCE TO RELATED APPLICATION

This application is a continuation-in-part of copending application, Ser. No. 172,205 filed Aug. 16, 1971, now abandoned, entitled Benzimidazole Derivatives As Fungicidal Active Compounds.

DESCRIPTION OF THE INVENTION

This invention relates to benzimidazole derivatives which exhibit high fungicidal activities. More specifically, this invention relates to benzimidazole compounds having the following formula:

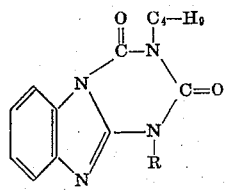

wherein R can be selected from the group consisting of hydrogen, sodium, potassium and ammonium.

The compounds of the present invention were manufactured by reacting [methyl] 1 (butylcarbamoyl)-2-benzimidazole carbamate with an alkali metal hydroxide selected from sodium, potassium or ammonium hydroxide in the presence of water at a pH of approximately 10–14, preferably around 12. The alkali metal is preferably sodium. The reaction product is obtained in essentially quantitative yields and can be defined as the cyclic alkali metal salt or ammonium salt derivative of the original reactive component with methanol being given off. This reaction product has shown as hereinafter set forth substantial fungicidal activities.

When it is desired to form the above cyclic compound wherein R is hydrogen, the pH of the salt derivative is reduced to 7 or below, preferably around 1 or 2, to provide essentially quantitative yields of the compound. The pH is reduced by adding an acid such as hydrochloric acid to the reaction product. In the alternative, [methyl] 1 (butylcarbamoyl)-2-benzimidazole carbamate can be treated with water in the presence of heat of up to about 125°C. to form the cyclized reaction product. The reaction product forms a two-phase liquid-solid system. The solid phase is stripped off and the liquid phase treated with acid to a pH of below 7, preferably around about 1 or 2, to form the cyclized product. It should be noted that when this compound is used to control fungi, it must first be dissolved in a hydroxide base material.

In order to illustrate the merits of the present invention, the following examples are provided:

EXAMPLE 1

To 60 mg. of a 50 percent wettable powder [methyl] 1 (butyl-carbamoyl)-2-benzimidazole carbamate, which is equivalent to 4 oz. active ingredient per 100 gallons of water, was added 0.4 g. of sodium hydroxide in 100 ml. of water. The pH was measured to be 12.3. The liquid reaction product was filtered and identified as:

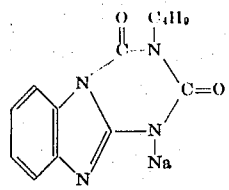

EXAMPLE 2

To 50 ml. of distilled water was added 1 g. of [methyl] 1 (butylcarbamoyl)-2-benzimidazole carbamate technical grade in 200 ml. of 1 N sodium hydroxide. This reaction product was filtered to leave a total volume of 245 ml. This product was treated with 250 ml. of 1 N hydrochloric acid to a pH of 1.0. A white precipitate was formed and identified as:

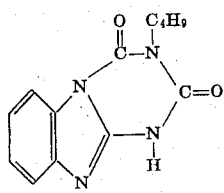

EXAMPLE 3

A 300 ppm solution of [methyl] 1 (butylcarbamoyl)-2-benzimidazole carbamate 50 percent wettable powder was made (0.3 g. 50 percent wettable powder per 500 ml.) and placed on a stirrer-heater and brought to 121°F. The reaction was allowed to proceed for 9 hours. Thereafter, a solid and liquid phase was present. The precipitate was removed and the liquid phase was treated with hydrochloric acid to obtain a pH of 1.0. The product precipitated and was removed by filtration and identified as:

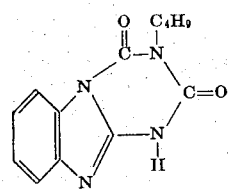

EXAMPLE 4

The procedure as set forth in Example 1 was repeated except potassium hydroxide was used in place of sodium hydroxide to yield the following compound:

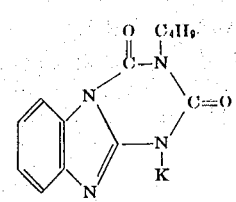

EXAMPLE 5

The procedure as set forth in Example 1 was repeated except ammonium hydroxide was used in place of sodium hydroxide to yield the following compound:

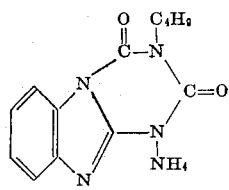

The compounds of this invention were tested to show fungicidal activities by the following procedure.

The compound of Example 2 was tested for fungicidal activity against several organisms in the following manner:

1,200 ml. of potato dextrose agar was added to a 2 l. flask. The slurry was then sterilized. While this slurry was still hot, the active compound was dissolved in 0.1 N sodium hydroxide at several different levels, 0, 10 and 50 ppm, and added thereto before the solution reached 45°C. The potato dextrose agar with the active compound added thereto were placed in petri dishes and allowed to harden. Thereafter, each petri plate with the agar was treated with plugs of the respective organisms to be tested. The growth of the fungus was then measured at 120 hours in millimeters to give the following results:

TABLE I

| | Control | 10 ppm | 50 ppm |
|---|---|---|---|
| Monilinia fructicola | 68 | 49 | 0 |
| Verticillium albo-atrum | 16 | 13 | 0 |
| Coryneum beijerinckii | 18 | 17 | 0 |
| Cytospora spp. | 60 | 54 | 0 |
| Cytosporina armeniaca | 48 | 17 | 0 |
| Ceratocystis fimbriata | 23 | 23 | 0 |

The compound of Example 1 was tested for fungicidal activity against Monilinia fructicola in essentially the same manner as noted above for the compound of Example 2, except the concentration was 0, 1 ppm, 10 ppm and 50 ppm, and the growth was allowed to proceed for 144 hours. The growth in millimeters at the end of this period is tabulated in Table II.

TABLE II

| Monilinia fructicola | Growth |
|---|---|
| 0 ppm | 65 |
| 1 ppm | 0 |
| 10 ppm | 0 |
| 50 ppm | 0 |

The compounds of Examples 4 and 5 were tested for fungicidal activity against Monilinia fructicola in essentially the same manner as noted above for the compound of Example 2, except the concentration was 0, 1 ppm and 10 ppm. The growth in millimeters is tabulated in Table III.

TABLE III

| Compound | Rate of Application | Growth |
|---|---|---|
| Example 4 | 0 ppm | 59 |
| Example 4 | 1 ppm | 18 |
| Example 4 | 10 ppm | 0 |
| Example 5 | 0 ppm | 62 |
| Example 5 | 1 ppm | 61 |
| Example 5 | 10 ppm | 0 |

The compounds of this invention are generally embodied into a form suitable for convenient application. For example, the compounds can be embodied into pesticidal compositions which are provided in the form of emulsions, suspensions, solutions, dusts and aerosol sprays. In general, such compositions will contain, in addition to the active compound, the adjuvants which are found normally in pesticide preparations. In these compositions, the active compounds of this invention can be employed as the sole pesticide component or they can be used in admixture with other compounds having similar utility. The pesticide compositions of this invention can contain, as adjuvants, organic solvents, such as sesame oil, xylene range solvents, heavy petroleum, etc.; water; emulsifying agents; surface active agents; talc; pyrophyllite; diatomite; gypsum; clays; propellants, such as dichlorodifluoromethane, etc. If desired, however, the active compounds can be applied directly to feedstuffs, seeds, etc. upon which the pests feed. When applied in such a manner, it will be advantageous to use a compound which is not volatile. In connection with the activity of the presently disclosed pesticidal compounds, it should be fully understood that it is not necessary that they be active as such. The purposes of this invention will be fully served if the compound is rendered active by external influences, such as light or by some physiological action which occurs when the compound is ingested into the body of the pest.

The precise manner in which the pesticidal compositions of this invention are used in any particular instance will be readily apparent to a person skilled in the art. Generally, the active pesticide compound will be embodied in the form of a liquid composition, for example, an emulsion, suspension, or aerosol spray.

What is claimed is:

1. The compound having the formula

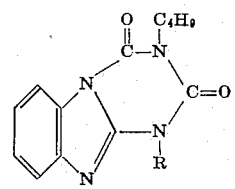

wherein R can be selected from hydrogen, sodium, potassium and ammonium.

2. The compound of claim 1 wherein R is hydrogen.
3. The compound of claim 1 wherein R is sodium.
4. The compound of claim 1 wherein R is potassium.
5. The compound of claim 1 wherein R is ammonium.
6. A process of manufacturing a fungicidal active compound comprising the steps of
   a. treating [methyl] 1 (butylcarbamoyl)-2-benzimidazole carbamate with an alkali metal hydroxide selected from sodium, potassium and ammonium hydroxide in the presence of water at a pH of between about 10 and 14;
   b. treating the reaction product of Step a) with acid at a pH of at least below 7 to yield a compound of the following formula:

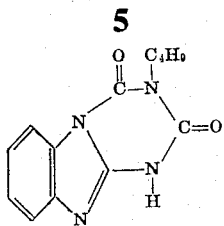

7. A process as set forth in claim 6 wherein said alkali metal hydroxide is sodium hydroxide.

8. The process as set forth in claim 6 wherein the alkali metal hydroxide is potassium hydroxide.

9. The process as set forth in claim 6 wherein the reactive salt is ammonium hydroxide.

10. A process of manufacturing a fungicidal active compound comprising the steps of:

a. treating [methyl] 1 (butylcarbamoyl)-2- benzimidazole carbamate with water in the presence of heat of up to about 125°C. to form a two-phase liquid-solid system;

b. separating the liquid phase from said solid phase;

c. treating said liquid phase with acid at a pH of below 7 to form the product

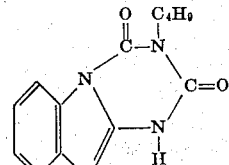

* * * * *